Patented July 8, 1952

2,602,826

UNITED STATES PATENT OFFICE 2,602,826

PROCESS FOR MANUFACTURING ALKALINE STORAGE BATTERIES

Max Joseph Stumbock, South Orange, N. J., assignor to Baker & Co., Inc., Newark, N. J., a corporation of New Jersey No Drawing. Application October 20, 1949, Serial No. 122,567

3 Claims. (Cl. 136—34)

This invention deals with alkaline storage batteries and their manufacture. The invention is more specifically concerned with the improvement of the positive electrodes of alkaline storage batteries of the nickel-iron and nickel-cadmium type.

The active material in the positive plates of alkaline storage batteries comprises oxides of nickel which may be mixed with other materials to improve the conductivity of the plates. The oxide powders of cadmium or iron, preferably mixed with particles of the metals, are used in the negative plates. The electrolyte may consist of a solution of approximately 21% of potassium hydroxide or the like. Small amounts of lithium hydroxide may be added to this solution for purposes which are well known in the art. It is generally thought that the oxide compositions in the positive plates are $NiO_2$, $Ni_2O_3$, $Ni(OH)_3$, after charging, and $NiO$, $Ni_2O_3$, $Ni_3O_4$, $Ni(OH)$, after discharging. All or part of these oxides are hydrated.

It is impractical to chemically produce the nickel oxide mass in such form which on assembly of the battery will produce its current equivalent. It is customary to fill the plates with the lower oxides and then convert them to the active state by passing direct current through the battery. This operation is known as forming the battery and is performed at the factory after the battery has been assembled and before it is used by the consumer who may thereafter charge and discharge the battery many times before it is spent.

The chief problem in the manufacture of batteries is the attainment of high capacity and high efficiency, a problem which is accentuated in the expensive alkaline storage batteries, so that, in such batteries, the utmost in capacity and efficiency is of greatest importance.

While alkaline storage batteries, especially those of the nickel-cadmium type, have admirable properties, their general manufacture is more complicated than that of ordinary batteries. One of the chief factors in the attainment of high capacity and high efficiency, combined with long life, is the formation of the active oxides of the positive plate.

It is one object of this invention to produce an improved storage battery. A further object is to subject an alkaline battery to a treatment which will enhance the useful life thereof. It is a special object of this invention to convert the nickel hydroxides in the positive electrodes of a storage battery to a form which will improve the capacity and stability of the battery. These and other objects of the invention will become apparent in the following detailed description and the appended claims.

In operating a battery, i. e. charging and discharging it, the current which passes through the battery causes it to become heated due to internal resistance and to the chemical changes which take place. During the charging process, the internal temperature increase for batteries having a large number of relatively closely packed plates ranges from 15° F. to 25° F., while the rise in temperature during discharge is approximately 10° F. These temperature variations depend largely upon the number of plates in the battery and upon the distance between the plates. A battery having a large number of plates has a greater temperature variation than one having a few plates, and a battery having its plates closely packed together becomes hotter on operation than one having its plates spaced relatively far apart. A battery is less efficient if operated at increased temperature, and it regains its original efficiency when it becomes cooled to its normal temperature. In any event, however, a storage battery should not be permitted to become heated above 115° F. during the charging or discharging thereof since such heating will cause permanent damage to the battery as is well known in the art.

The present invention is based on the discovery that the formation of the active oxides from the lower and inactive oxides can be controlled most efficiently and simply by a control of the temperature at which such formation takes place, thus obviating other, more difficult, methods and attaining a substantial increase in the capacity of the alkaline storage battery.

In the forming operation, as distinguished from the subsequent charging and discharging operations, the nickel hydroxide compounds in the positive plates of a storage battery are permanently changed into a less active form if the temperature of the electrolyte is permitted to rise above a critical range which is much lower than the temperature referred to above, i. e. 115° F. If on the other hand, the temperature is properly controlled as set forth hereinafter, the nickel oxide and/or hydroxide compounds retain an increased efficiency even if later the battery is operated at higher temperatures. The forming operation which converts the nickel compound mass to the active state may comprise only a single charging operation, but preferably a plurality of successive charging and discharging operations are performed before the battery is put to use.

In accordance with the invention, the temperature of the electrolyte is maintained within the range of 45° F. to 60° F. during the entire forming operation. The preferred range is from 45° F. to 55° F., the average and optimum temperature being approximately 50° F. The result obtained is the formation of a highly efficient active mass, making possible a permanent increase of from 20% to 30% in the ampere-hour capacity, as compared with batteries that are formed at higher temperatures.

In order to control the temperature within these limits, cold air is circulated thoroughly about and around the battery during the entire forming period, the air being at such temperatures and in such volume as will cause the desired temperatures of the electrolyte to be maintained. It is obvious that this cooling process may be performed in any other suitable manner such as by immersing the battery in a cold liquid bath.

The following examples compare the results obtained by practicing the invention with those obtained otherwise. These examples are given by way of illustration and it is not intended that the scope of this invention be limited thereby.

*Example 1*

Twelve batteries which had not been previously charged or discharged were placed upon a support and were cooled by circulating air around them. The temperature and the volume of the air were maintained at such values that the temperature of the electrolyte of the batteries did not in any case exceed 59° F. during the entire forming process. All of the batteries were charged and discharged four successive times. The volume of the cooling gas was adjusted as required to maintain the electrolyte temperature at approximately 50° F., a temperature which has been found to give the best results. During most of the time, the temperature of the electrolyte remained within the range of from 45° F. to 55° F. The maximum temperature reached was 59° F. while the minimum temperature was 44° F. Following this formation treatment, the batteries were charged and discharged eight successive times without cooling. The electrolyte or internal temperatures during these subsequent charging and discharging periods varied from 75° F. to 95° F. The eight charging periods were each of 8 hours duration while the eight discharging periods were each of 5½ hours duration. The last discharge showed that the average potential which was measured after 5½ hours of discharge at a constant current of 84 amperes was 1.12 volts. The minimum potential of any of these batteries was 1.10 volts.

*Example 2*

Twenty-four batteries were treated in the same manner as set forth in Example 1 except that the electrolyte temperatures varied between approximately 59° F. and 75° F. during the forming operation. Following this forming operation, which consisted of four successive charging and discharging periods as in Example 1, the batteries were charged and discharged for eight successive periods. During this production period, the internal temperatures ranged between 75° F. and 95° F. as in Example 1. The last discharge operation showed that the average potential after 5½ hours of discharge at a constant current of 84 amperes was 0.70 volt. None of the batteries used in this example had a potential greater than 0.83 volt at the end of the test.

All of the specimens used in the above examples were from the same manufactured lot of nickel-cadmium storage batteries, rated at 84 amperes, i. e. following a discharge period of 5 hours with a constant current of 84 amperes the potential should not drop below 1.0 volt. The examples show that the batteries which were cold-formed according to the method of this invention (Example 1) performed well above the minimum requirements since their potentials exceeded 1.0 volt, whereas those batteries which were formed at higher temperatures failed upon the eighth discharge. Many of the batteries of Example 2 reduced in potential below 1.0 volt at 4½ hours after the start of the eighth discharge period. Detailed experiments have been made with storage cells having a single positive plate and the results of these experiments confirm those obtained in the above examples. It is clear, therefore, that batteries which have been formed in accordance with this invention exhibit a higher ampere-hour capacity than similar batteries which have been formed without regard to the internal temperature.

The efficiency of batteries which have been formed according to this invention is greater than otherwise since they may discharge for a longer period than batteries not so formed. The useful life of the battery is extended since batteries formed by this invention may be charged and discharged many times more than those formed otherwise. The nickel compound mass in the positive plates of the alkaline battery is converted, or electrolysed, into a more active state. If the battery is, however, formed without regard to the internal temperature, a portion of the nickel compound mass is converted into a state which is less active and which cannot thereafter be restored. The term "oxide" as herein used in connection with nickel includes not only oxides as such, but also hydroxides.

What I claim is:

1. The method of forming a nickel-cadmium-alkaline storage battery which comprises charging and discharging the battery for several successive periods and circulating cooled air around the battery, the temperature and volume of the air being such that the resulting temperature of the electrolyte within the battery does not exceed 55° F.

2. The method of increasing the capacity of a cadmium-nickel-alkaline storage battery which comprises the step of subjecting the assembled battery during the first cycles of charging and discharging to a cooling process which maintains the temperature of the electrolyte of the battery in the range of from 45° F. to 55° F.

3. The method of treating a nickel-cadmium-alkaline storage battery to improve its efficiency which comprises the steps of assembling the battery, charging and discharging the battery for at least four successive periods at its rated ampere-hour capacity while simultaneously controlling the temperature of the electrolyte of the battery at approximately 50° F., and thereafter charging and discharging the battery without regard to the temperature except that in no event is the temperature permitted to exceed 115° F.

MAX JOSEPH STUMBOCK.

REFERENCES CITED

The following references are of record in the file of this patent:

UNITED STATES PATENTS

| Number | Name | Date |
|---|---|---|
| 649,491 | Sperry | May 15, 1900 |
| 746,289 | Chamberlain | Dec. 8, 1903 |
| 867,517 | Leitner | Oct. 1, 1907 |
| 1,363,889 | Linebarger | Dec. 28, 1920 |
| 1,587,425 | Schepp | June 1, 1926 |
| 2,282,923 | Ambruster | May 12, 1942 |

OTHER REFERENCES

Zimmerman Electrochem. Soc., vol. 68, page 238, Oct. 1935.